United States Patent
Nakahara (10) Patent No.: US 10,373,029 B2
(45) Date of Patent: Aug. 6, 2019

(54) DATA PROCESSING METHOD, DATA PROCESSING DEVICE THAT EXECUTE FONT PROCESSING EFFICIENTLY USING A PLURALITY OF CORES OF PROCESSOR, AND RECORDING MEDIUM THEREFOR

(71) Applicant: Kyocera Document Solutions Inc., Osaka (JP)

(72) Inventor: Hideo Nakahara, Torrance, CA (US)

(73) Assignee: Kyocera Document Solutions Inc., Osaka (JP)

( * ) Notice: Subject to any disclaimer, the term of this patent is extended or adjusted under 35 U.S.C. 154(b) by 16 days.

(21) Appl. No.: 15/665,324

(22) Filed: Jul. 31, 2017

(65) Prior Publication Data

US 2019/0034768 A1    Jan. 31, 2019

(51) Int. Cl.
  *G06K 15/02* (2006.01)
  *H04N 1/00* (2006.01)
(52) U.S. Cl.
  CPC ..... *G06K 15/1802* (2013.01); *G06K 15/1813* (2013.01); *G06K 15/1822* (2013.01); *G06K 15/1834* (2013.01); *G06K 15/1838* (2013.01); *G06K 15/1898* (2013.01); *G06K 2215/0011* (2013.01); *G06K 2215/0045* (2013.01)
(58) Field of Classification Search
  CPC .......... G06K 15/1857; G06K 15/1802; G06K 15/1813; G06K 15/1834; G06K 15/1836; G06K 15/1838; G06K 15/1898; G06K 2215/0011; G06K 2215/0045; G06F 3/1211; G06F 3/122; G06F 3/124; G06F 3/1245; G06F 3/1247; G06F 9/3009; G06F 9/3851; G06F 9/46; G06F 9/50; G06T 1/20; G06T 1/60
  USPC .......... 358/1.11–1.18, 1.9, 2.1; 345/543, 557, 345/551
  See application file for complete search history.

(56) References Cited

U.S. PATENT DOCUMENTS

| | | | |
|---|---|---|---|
| 9,036,702 B2 | 5/2015 | Yang et al. | |
| 2005/0219253 A1* | 10/2005 | Piazza | G06T 15/005 345/557 |
| 2011/0267645 A1* | 11/2011 | Miyazaki | G06F 3/1211 358/1.15 |

(Continued)

FOREIGN PATENT DOCUMENTS

| | | | |
|---|---|---|---|
| JP | 2012-071544 A | | 4/2012 |
| JP | 2012071544 A | * | 4/2012 |
| JP | 2015-022685 A | | 2/2015 |

*Primary Examiner* — Chad Dickerson
(74) *Attorney, Agent, or Firm* — HEA Law PLLC (57) ABSTRACT

A data processing method processes data using a processor including N (N is an integer equal to or more than 2) cores and a memory. The data processing method includes: searching a new character as a character whose raster data is not stored in the memory among a plurality of characters specified by character data included in print data to count a count of the searched new characters; generating M (M is an integer equal to or less than the N) threads, wherein the M is a count determined based on the count of the counted new characters among the N; dividing and allocating the plurality of characters to the M threads to generate raster data for the new characters using any one of the N cores for each of the M threads; and rendering the plurality of characters using raster data corresponding to the character data.

12 Claims, 6 Drawing Sheets

(56) References Cited

U.S. PATENT DOCUMENTS

2012/0133964 A1\* 5/2012 Hayakawa ............ G06F 3/1211
　　　　　　　　　　　　　　　　　　　　358/1.13
2012/0133984 A1\* 5/2012 Hayakawa ............ G06F 3/1211
　　　　　　　　　　　　　　　　　　　　358/1.16

\* cited by examiner

DATA PROCESSING METHOD, DATA PROCESSING DEVICE THAT EXECUTE FONT PROCESSING EFFICIENTLY USING A PLURALITY OF CORES OF PROCESSOR, AND RECORDING MEDIUM THEREFOR

BACKGROUND

Unless otherwise indicated herein, the description in this section is not prior art to the claims in this application and is not admitted to be prior art by inclusion in this section.

An image forming apparatus, for example, a printer, a multifunction printer, or a multifunction peripheral (MFP) enables performing a printing process based on a print job that is described using a page description language (PDL). The printing process includes a font rasterizing process that generates raster data by rasterization based on font data (for example, outline-font data) included in a print job. Since a font rasterizing process requires large processing cost, raster data is commonly stored in a font cache and reused. On the other hand, some central processing units (processors) have been improving in processing capability by having a plurality of cores.

SUMMARY

A data processing method according to one aspect of the disclosure processes data using a processor including N (N is an integer equal to or more than 2) cores and a memory. The data processing method includes: searching a new character as a character whose raster data is not stored in the memory among a plurality of characters specified by character data included in print data to count a count of the searched new characters; generating M (M is an integer equal to or less than the N) threads, wherein the M is a count determined based on the count of the counted new characters among the N; dividing and allocating the plurality of characters to the M threads to generate raster data for the new characters using any one of the N cores for each of the M threads; and rendering the plurality of characters using raster data corresponding to the character data.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

A. Embodiment

The following describes a configuration for implementing the disclosure (hereinafter referred to as "embodiment") with reference to the accompanying drawings.

Figure 1:
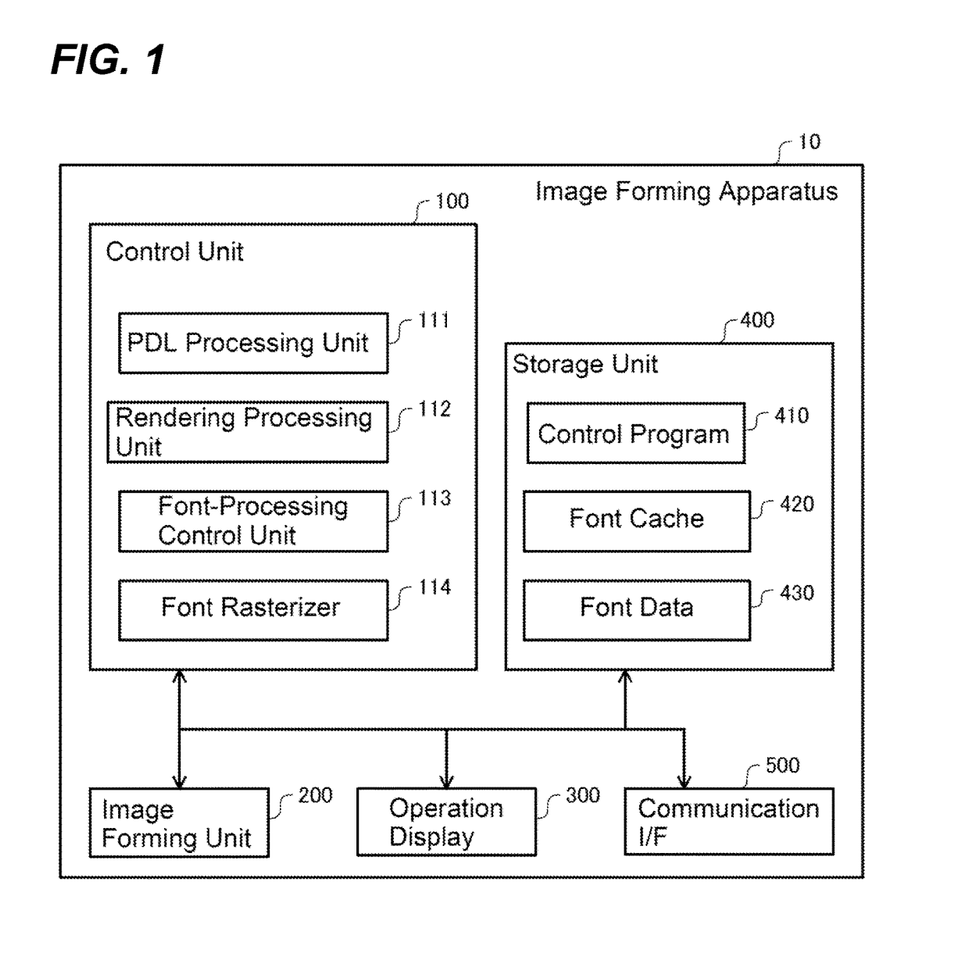
FIG. 1 illustrates a block diagram for illustrating a functional configuration of an image forming apparatus according to one embodiment of the disclosure.

FIG. 1 illustrates a block diagram for illustrating a functional configuration of an image forming apparatus 10 according to one embodiment of the disclosure. The image forming apparatus 10 includes a control unit 100, an image forming unit 200, an operation display 300, a storage unit 400, and a communication interface unit 500. The operation display 300 functions as a touch panel and displays various menus as an input screen to accept an operation input by a user. The communication interface unit 500 performs communication using, for example, a Transmission Control Protocol/Internet Protocol (TCP/IP) protocol group.

The image forming apparatus 10 can receive a print job that includes PDL data described using a page description language (PDL) via the communication interface unit 500. The PDL includes, for example, PCL XL, PostScript, PCL, RPCS, Portable Document Format (PDF) and XPS. The PDL data is also referred to as print data.

The control unit 100 includes a PDL processing unit 111, a rendering processing unit 112, a font-processing control unit 113, and a font rasterizer 114. The PDL processing unit 111 analyzes PDL data to extract objects such as texts (characters), images, and vector graphics that are included in the PDL data. The rendering processing unit 112 uses each object to generate image data based on rendering information included in the PDL data. The storage unit 400 will be described later.

Figure 2:
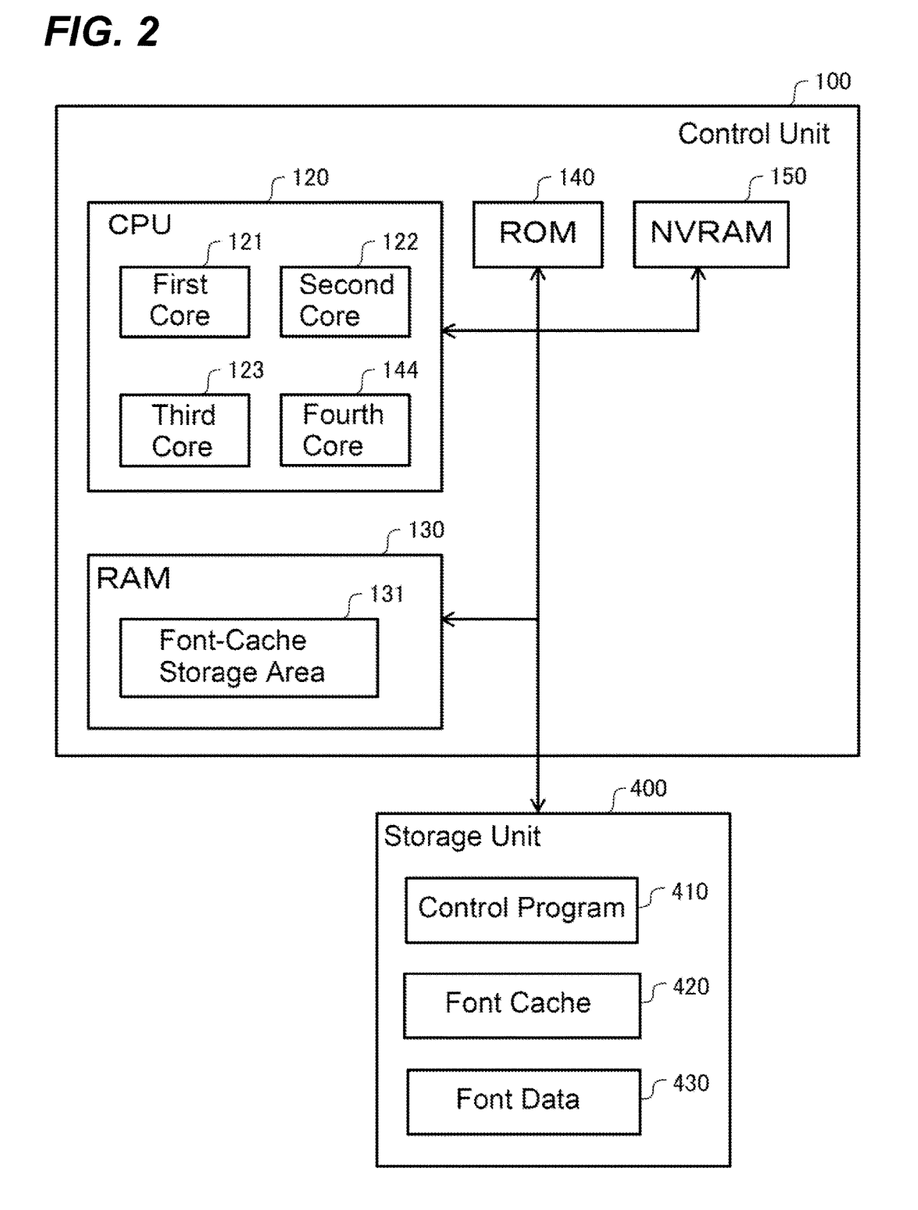
FIG. 2 illustrates an explanatory diagram for illustrating a hardware configuration of a control unit of the image forming apparatus according to the one embodiment.

FIG. 2 illustrates an explanatory diagram for illustrating a hardware configuration of the control unit 100 of the image forming apparatus 10 according to the one embodiment. The control unit 100 includes a central processing unit (CPU) 120, a RAM 130, a ROM 140, and an NVRAM 150. The control unit 100 has a controller function related to an interface such as various I/Os, a universal serial bus (USB), a bus, and some other hardware, and controls the respective units of the entire image forming apparatus 10.

The CPU 120 is a multi-core processor that includes four cores of a first core 121, a second core 122, a third core 123, and a fourth core 124. The RAM 130 is used as a work memory for software to operate. The NVRAM 150 is a non-volatile memory for storing print conditions or similar condition that is set to the image forming apparatus 10. The RAM 130 has a font-cache storage area 131 for storing bitmap data and raster data of characters.

The storage unit 400 is a storage device that includes a hard disk drive, which is a non-transitory recording medium, a flash memory, and similar memory. The storage unit 400 stores a control program 410 for processes that the control unit 100 executes, and various kinds of data such as a font cache 420 and font data 430. The control program 410 is loaded into the RAM 130 during activation of the image forming apparatus 10. The control unit 100 controls the whole image forming apparatus 10 by executing the control program 410. The font cache 420 is loaded into the font-cache storage area 131 during the activation of the image forming apparatus 10.

The font data 430 is data for identifying a shape of a character in rendering of a character that becomes a formation target in the image forming unit 200. A font is a set of character shapes that are designed in a certain typeface. The font data 430 includes any font data of a bitmap font and an outline font. The bitmap font is a font-data format that expresses a shape of a glyph (a character shape of a character) as a pattern that a set of binary bits forms. The bitmap font includes bitmap data that is a set of binary bits.

In the outline font, the font data is a combination of a character code, a glyph index, and shape data of a font by an outline. Shape data expresses a shape of a glyph (a character shape of a character) by connecting any coordinate points with a straight line or a curved line to constitute an outline. The outline font is used after being converted to raster data by the font rasterizer 114 based on a font face such as a type style and a character size. The type style is a character-shape style that forms a family of a certain typeface and includes, for example, italic and bold of a European typeface. The character size is a size of a character and is identical to a height in a line feed direction of a virtual body in a digital font.

The outline font is converted into raster data and is stored in the font-cache storage area 131 to be used for a printing process. This enables the image forming unit 200 to render characters at high speed and with less processing cost by reading the raster data, which is rasterized from the outline font, from the font-cache storage area 131 and then reusing them. Thus, the data including raster data, which is rasterized, is also simply referred to as a font cache. The raster data has a set of bits that are binary bits when an anti-aliasing processing is not applied, for example. The raster data undergoes a scale conversion into resolution of a page and may be a scan line.

Figure 3:
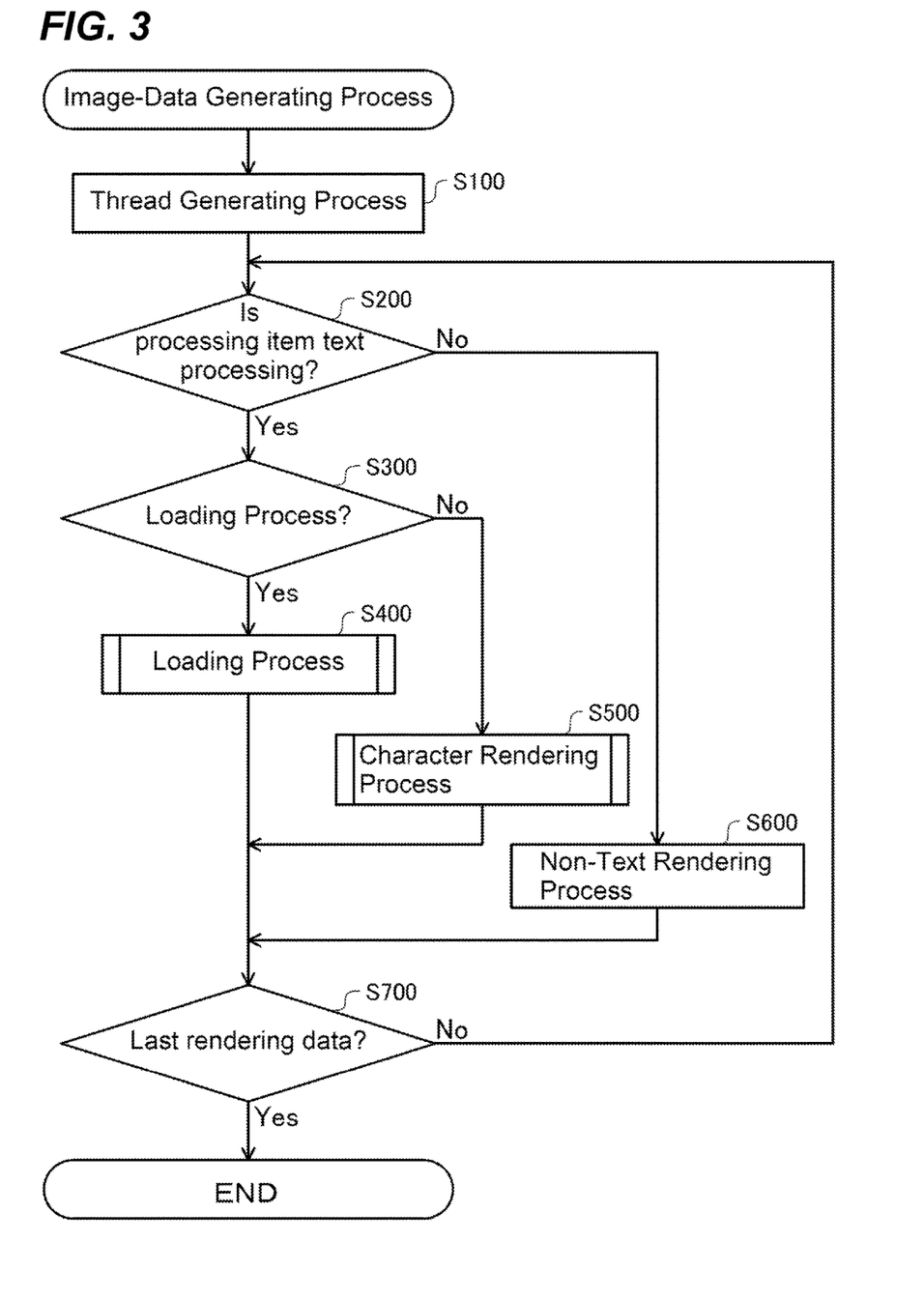
FIG. 3 illustrates contents of an image-data generating process according to the one embodiment.

FIG. 3 illustrates contents of an image-data generating process according to the one embodiment. At Step S100, the font-processing control unit 113 of the control unit 100 executes a thread generating process using, for example, the second core 122. In the thread generating process, the font-processing control unit 113 generates a cache-generation thread for generating a cache of a font, which will be described later. The cache-generation thread can generate a cache of a font by efficiently using a plurality of cores 121 to 124 of the CPU 120.

A count of the cache-generation thread is a core count of the CPU 120 (in this example, four pieces) at a maximum. In this embodiment, because the rendering process is concurrently executed during generation of the font cache, the font-processing control unit 113 generates three cache-generation threads. Numbers among the number 0 to the number 2 are attached to the respective three cache-generation threads.

At Step S200, the PDL processing unit 111 of the control unit 100 analyzes the PDL data using the first core 121 and then determines whether a processing item is a text processing or not. When the processing item is the text processing, the PDL processing unit 111 advances the process to Step S300. When the processing item is not the text processing, the PDL processing unit 111 advances the process to Step S600. At Step S600, the rendering processing unit 112 generates image data using the objects such as the image and the vector graphics.

At Step S300, the PDL processing unit 111 determines whether the processing item is a loading process of the font data or not, using the first core 121. Specifically, the PDL processing unit 111, by analyzing the PDL data, determines whether character data, which is font data of a character of a rendering target, is stored in the font-cache storage area 131 in the RAM 130 or not. The character data is a combination of the character code, the type style, the character size, and the typeface that are extracted by the PDL processing unit 111.

Since the processing item becomes the loading process when having determined that the character data is not stored, the PDL processing unit 111 advances the process to Step S400. Since the processing item is not the loading process when having determined that the character data is stored, the PDL processing unit 111 advances the process to Step S500.

Figure 4:
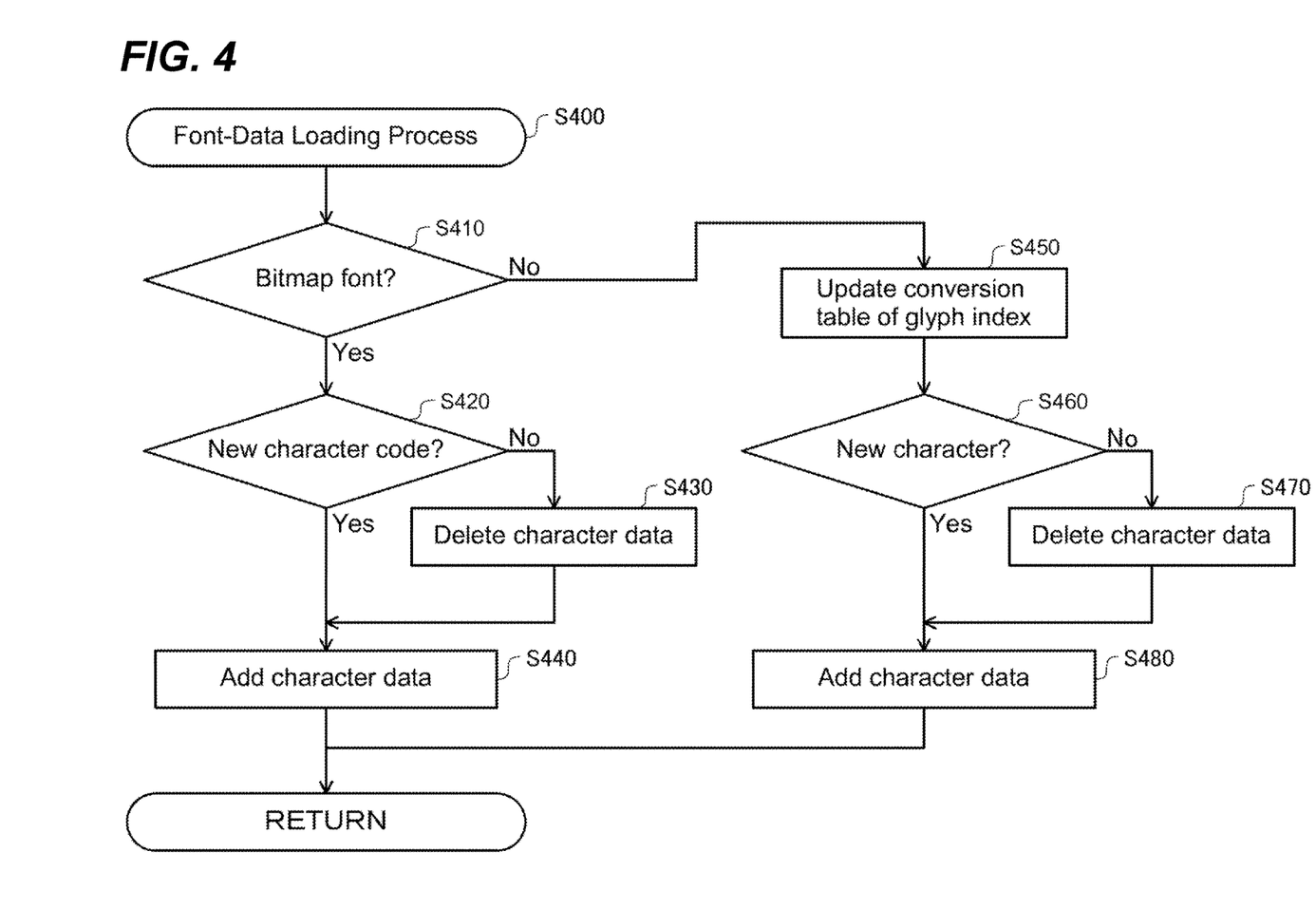
FIG. 4 illustrates contents of a font-data loading process according to the one embodiment.

FIG. 4 illustrates contents of a font-data loading process according to the one embodiment. At Step S400, the font-processing control unit 113 executes the loading process using the second core 122. In the loading process, for a character that cannot be rendered by the font cache stored in the font-cache storage area 131, the font-processing control unit 113 reads the font data for rendering the character from the font data 430 in the storage unit 400 and then stores it in the font-cache storage area 131.

In this example, assume that, among the characters, for example, α, β and γ, the font cache of the character α is stored in the font-cache storage area 131 and the font caches of the characters β and γ are not stored in the font-cache storage area 131. The font-processing control unit 113 consequently reads the font data corresponding to the characters β and γ from the font data 430. The characters β and γ are also referred to as a new character.

In this example, assume that the character code of the character β is not stored in the font-cache storage area 131. On the other hand, assume that although the character code of the character γ is stored in the font-cache storage area 131, the raster data where the type style is different is stored.

At Step S410, the font-processing control unit 113 determines whether the font data corresponding to the characters β and γ is the bitmap font or not, using the second core 122. When the font data is the bitmap font, the font-processing control unit 113 advances the process to Step S420. When the font data is not the bitmap font, the font-processing control unit 113 advances the process to Step S450.

At Step S420, when the character code of the bitmap font, which is loaded by using the second core 122, is not new, the font-processing control unit 113 advances the process to Step S430. When the character code of the bitmap font is new, the font-processing control unit 113 advances the process to Step S440.

At Step S430, the font-processing control unit 113 deletes the font cache stored in the font-cache storage area 131 using the second core 122. The font cache is a combination of the character data and the raster data. Specifically, when the type style is standard in the character data stored in the font-cache storage area 131, and an italic font face is set as the type style of the character of the rendering target, the font-processing control unit 113 deletes the standard character data together with the raster data.

At Step S440, the font-processing control unit 113 adds the character data to the font-cache storage area 131 using the second core 122. The font-cache storage area 131 is in a state where the character data is stored while the raster data is not stored.

At Step S450, the font-processing control unit 113 updates a conversion table of a glyph index using the second core 122. The glyph index is a unique number in 16 bits and manages the glyph (character shape). The font-processing control unit 113 updates the conversion table to be able to manage the characters β and γ, which are new characters.

At Step S460, when the character code of the outline font, which is loaded by using the second core 122, is not new, the font-processing control unit 113 advances the process to Step S470. When the character code of the outline font is new, the font-processing control unit 113 advances the process to Step S480.

At Step S470, the font-processing control unit 113 deletes the font cache (the combination of the character data and the raster data) stored in the font-cache storage area 131, using the second core 122. At Step S480, the font-processing control unit 113 adds the character data (the combination of the character code, the type style, the character size, and the typeface) to the font-cache storage area 131.

At Step S500 (see FIG. 3), the rendering processing unit 112 executes a character rendering process using the first core 121. In the character rendering process, the rendering processing unit 112 uses the object of the text (character) to generate the image data based on the rendering information included in the PDL data.

Figure 5:
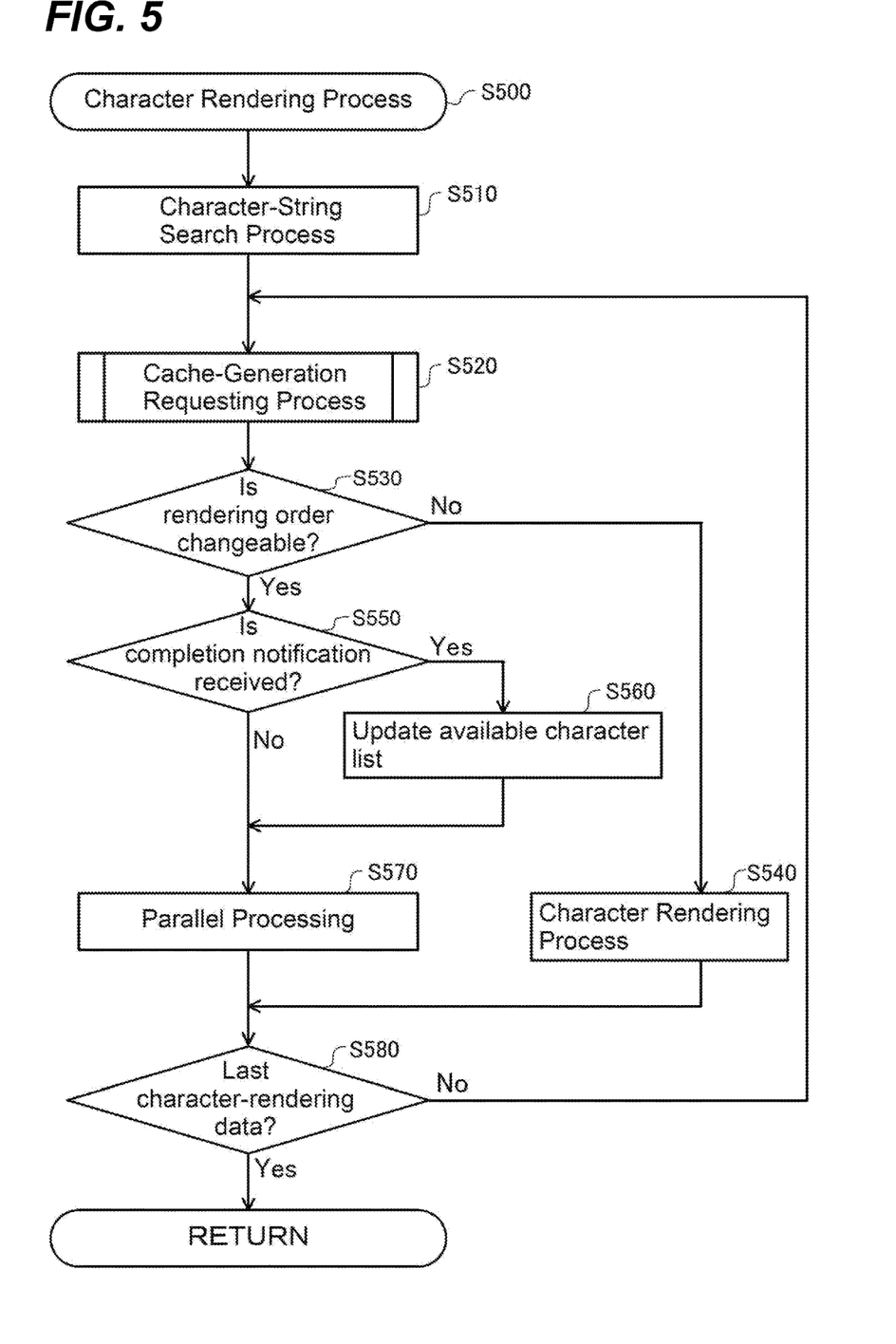
FIG. 5 illustrates contents of a character rendering process according to the one embodiment.

FIG. 5 illustrates contents of the character rendering process according to the one embodiment. At Step S510, the rendering processing unit 112 executes a character-string search process using the first core 121. In the character-string search process, the font-processing control unit 113 searches the character where the font cache is not generated and then counts the count of new characters where the font cache is not yet generated. The count of the new characters is counted as two, for example, when there are two kinds of type styles even when the character code is identical. This enables the image forming apparatus 10 to perform an early start of font-cache generation and quick completion of the rendering process.

Specifically, for example, assume that a character string "αβγβα" is searched by the font-processing control unit 113. In this case, since the font cache of the character α is stored in the font-cache storage area 131 and the font caches of the characters β and γ are not stored in the font-cache storage area 131, the two characters β and γ become the generation target of the font cache.

At Step S520, the rendering processing unit 112 executes a cache-generation requesting process using the first core 121. In the cache-generation requesting process, the rendering processing unit 112 requests the font-processing control unit 113 to generate the cache and also advances the process to Step S530.

This enables the rendering processing unit 112 to execute the character rendering process by using the first core 121, and enables the font rasterizer 114 to execute a cache generating process in parallel with the character rendering process by using another core. Another core is at least one of the second core 122 to the fourth core 124.

Figure 6:
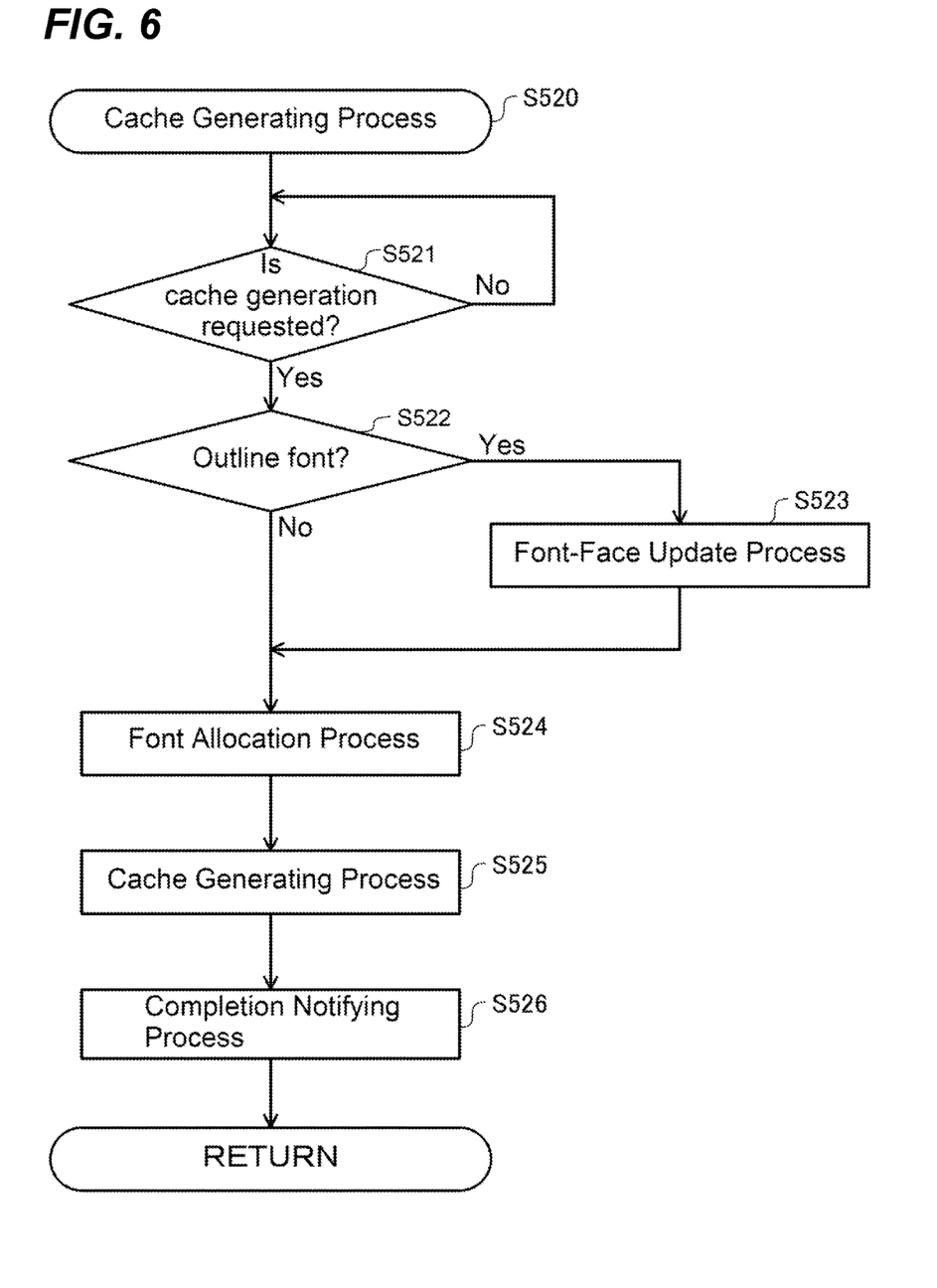
FIG. 6 illustrates contents of a cache generating process according to the one embodiment.

FIG. 6 illustrates contents of the cache generating process according to the one embodiment. In the cache generating process, the font rasterizer 114 generates the font cache efficiently using the plurality of cores of the CPU 120, which is a multi-core processor. The plurality of cores can generate the raster data by using the three cache-generation threads, which are numbered using the number 0 to the number 2.

The font-processing control unit 113 is in a state of waiting the cache-generation request from the rendering processing unit 112 (Step S521). The font-processing control unit 113 advances the process to Step S522 corresponding to reception of the cache-generation request.

At Step S522, the font-processing control unit 113 determines whether the font data, which is loaded by using, for example, the second core 122, is the outline font or not. When the font data is the outline font, the font-processing control unit 113 advances the process to Step S523. When the font data is not the outline font, the font-processing control unit 113 advances the process to Step S524.

At Step S523, the font-processing control unit 113 executes update processing of the font face using the second core 122. When the type style specified by the PDL data is, for example, italic, and the type style of the character stored in the font-cache storage area 131 is standard, the update processing of the font face updates the type style of the font face from the standard to italic.

At Step S524, the font-processing control unit 113 executes a font allocation process by using the second core 122. In this example, in the font allocation process, the font rasterizer 114 allocates the cache generating process of the character β to a number 0 thread, which is the thread of number 0, and allocates the cache generating process of the character γ to a number 1 thread, which is the thread of number 1.

In this example, since maximum thread count, which is available, is three, the font allocation process can be executed as follows. Specifically, when generating the caches for 10 characters of ABCDEFGHIJ, the font-processing control unit 113 can divide and allocate them, for example, as follows.

(1) Number 0 thread: A, D, G, J
(2) Number 1 thread: B, E, H
(3) Number 2 thread: C, F, I In this example, the font-processing control unit 113 allocates $N^{th}$ characters to the number 0 thread, $(N+1)^{th}$ characters to the number 1 thread, and $(N+2)^{th}$ characters to the number 2 thread. Here, N is a natural number.

At Step S525, in this example, the font rasterizer 114 generates the raster data of the character β using the second core 122 and generates the raster data of the character γ using the third core 123. The raster data of the character β is generated by execution of the process of the number 0 thread based on a combination of the type style, the character size, and outline data, which are included in the character data of β. The raster data of the character γ is generated by execution of the process of the number 1 thread based on a combination of the type style, the character size, and outline data, which are included in the character data of γ. The outline data is shape data of a font by an outline.

The second core 122 combines the character data of β and the raster data of the character β using the number 0 thread to generate the font cache of the character β. The third core 123 combines the character data of γ and the raster data of the character γ using the number 1 thread to generate the font cache of the character γ. The generation of the font cache of the character β is performed in parallel with the generation of the font cache of the character γ.

For the bitmap font, the font rasterizer 114 adjusts the bitmap data by enlarging or reducing it based on the character size as necessary and can generate the font cache by combining with the character data. The generated font cache is stored in the font cache 420 and the font-cache storage area 131.

At Step S526, the font-processing control unit 113 executes a completion notifying process using the fourth core 124. In the completion notifying process, the font-processing control unit 113 notifies the rendering processing unit 112 of cache-generation completion of the character β in response to the cache-generation completion of the character β and notifies the rendering processing unit 112 of cache-generation completion of the character γ in response to the cache-generation completion of the character γ.

At Step S530, the rendering processing unit 112 determines whether rendering order is changeable based on the PDL data or not. When the rendering order is changeable, the rendering processing unit 112 advances the process to Step S550. When the rendering order is unchangeable, the rendering processing unit 112 advances the process to Step S540. The case where the rendering order is unchangeable means, for example, the case where order of the rendering process of a plurality of characters constituting a character string of a rendering target depends on the order of the plurality of characters.

At Step S540, the rendering processing unit 112 executes a character rendering process. In the character rendering process, the rendering processing unit 112 executes the rendering process (rendering) without changing the rendering order of the characters as the rendering targets.

Specifically, the rendering processing unit 112 executes the character rendering process using the characters the caches of which are stored in the font-cache storage area 131. When the cache of the character, which becomes the rendering target, is not stored in the font-cache storage area 131, the rendering processing unit 112 halts the rendering process and waits until reception of notification of the cache-generation completion of the character. The rendering processing unit 112 can resume the rendering process in response to the reception of the notification of the cache-generation completion.

At Step S550, the rendering processing unit 112 determines whether a completion notification is received from the font-processing control unit 113 or not. When the completion notification is received, the rendering processing unit 112 advances the process to Step S560. When the completion notification is not received, the rendering processing unit 112 advances the process to S570.

At Step S560, the rendering processing unit 112 updates an available character list. The available character list is a list of the characters the caches of which are stored in the font-cache storage area 131 and that are available for rendering. In response to the reception of the notification of the cache-generation completion of, for example, the character β, the rendering processing unit 112 additionally registers the character β in the available character list.

At Step S570, the rendering processing unit 112 executes concurrent processing of the character rendering process and the cache generating process. Specifically, without waiting the cache-generation completion by the font rasterizer 114, the rendering processing unit 112 skips the rendering process of the character that is not registered in the available character list and executes the character rendering process using only the characters registered in the available character list.

In this example, when the characters β and γ are not registered in the available character list, the rendering processing unit 112 skips the character rendering process of the characters β and γ and executes the character rendering process of the other characters. However, the rendering processing unit 112 executes the rendering of the character that has newly become available in response to the update of the available character list.

Specifically, when the PDL is, for example, PCL XL, position-feed data of a character is included together with data of a character string in data of a character-rendering operator. The rendering processing unit 112 renders the character, where the cache of the font has already been generated, and moves the rendering position using the position-feed data of the character. Then the rendering processing unit 112 skips the character, where the cache of the font is in process of generation, and moves the rendering position by the position-feed data of the character. Corresponding to the notification of the cache-generation completion of the font, the rendering processing unit 112 can render the character at its rendering position.

The rendering processing unit 112 repeats the processes from Step S510 to Step S570 up to the last character-rendering data and then completes the rendering process (Step S580). The rendering processing unit 112 further repeats the processes from Step S100 to Step S600 up to the last rendering data and then completes the rendering process (Step S700).

Thus, the image forming apparatus 10 according to the one embodiment ensures execution of the high-speed rendering process by efficiently using the plurality of cores in the printing process including the font rasterizing process. Furthermore, because of enabling an early start of generation of the font cache, the image forming apparatus 10 ensures quick completion of the rendering process by parallel processing with the rendering process.

B. Modifications

In addition to the above-described respective embodiments, the following modifications implement the disclosure.

Modification 1

While in the above-described embodiment one core is used for the process other than the font-cache generation and the remaining cores are used for the font-cache generation, the plurality of cores may be distributed corresponding to its processing load. For example, two or more cores may be used for the process other than the font-cache generation and the remaining cores may be used for the font-cache generation. Further, allocation of the cores may be automatically changed corresponding to processing load.

Modification 2

While in the above-described embodiment one of the cores is allocated for the rendering process in the printing process, when, for example, the rendering order is determined to be unchangeable, all the cores (four in the embodiment) may be allocated for the cache-generation process. This ensures the increased speed rendering process when the rendering order is determined to be unchangeable.

Modification 3

While in the above-described embodiment the disclosure is applied to the data processing as the character rendering process in the image forming apparatus, the disclosure is also applicable to data processing as a character rendering process in an image display apparatus such as a display.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A data processing method for processing data using a processor including N (N being an integer equal to or more than 2) cores and a memory, the data processing method comprising:
   searching a new character as a character whose raster data is not stored in the memory among a plurality of characters specified by character data included in print data to count a count of the searched new characters;
   generating M (M being an integer equal to or less than the N) threads, the M being a count determined based on the count of the counted new characters among the N cores;
   dividing and allocating the plurality of characters to the M threads to generate raster data for the new characters using any one of the N cores for each of the M threads; and
   rendering the plurality of characters using raster data corresponding to the character data,
   wherein two or more cores are used for font cache generation, and one or more cores is used for processing other than font cache generation, and
   wherein the allocation of processor cores to font cache generation is automatically changed in correspondence with a processing load for performing processing not associated with font cache generation.

2. The data processing method according to claim 1, wherein the rendering includes rendering the plurality of characters using a core that is different from the core used for processing of M threads, among the N cores.

3. The data processing method according to claim 2, wherein:
   the print data is described using a page description language;
   the rendering includes determining whether an order of a rendering process of the plurality of characters is changeable by analyzing the print data; and
   when the order is determined to be unchangeable, the raster-data generation includes allocating the core used for the rendering to a generation of raster data for the new characters.

4. The data processing method according to claim 1, wherein:
   the print data is described using a page description language;
   the rendering includes determining whether an order of a rendering process of the plurality of characters is changeable by analyzing the print data; and
   when the order is determined to be changeable, the rendering includes skipping the rendering of the character whose raster data is in process of generation and executing the rendering of the skipped character in response to completion of generation of the raster data.

5. A data processing device comprising:
   a processor having N (N being an integer equal to or more than 2) cores; and
   data storage storing computer-readable instructions that, when executed by the processor, causes the data processing device to perform tasks comprising:
   searching a new character as a character whose raster data is not stored in the memory among a plurality of characters specified by character data included in print data to count a count of the searched new characters;
   generating M (M being an integer equal to or less than the N) threads, the M being a count determined based on the count of the counted new characters among the N cores;
   dividing and allocating the plurality of characters to the M threads to generate raster data for the new characters using any one of the N cores for each of the M threads; and
   rendering the plurality of characters using raster data corresponding to the character data,
   wherein two or more cores are used for font cache generation, and one or more cores is used for processing other than font cache generation, and
   wherein the allocation of processor cores to font cache generation is automatically changed in correspondence with a processing load for performing processing not associated with font cache generation.

6. The data processing device according to claim 5, wherein the rendering includes rendering the plurality of characters using a core that is different from the core used for processing of M threads, among the N cores.

7. The data processing device according to claim 6, wherein:
   the print data is described using a page description language;
   the rendering includes determining whether an order of a rendering process of the plurality of characters is changeable by analyzing the print data; and
   when the order is determined to be unchangeable, the raster-data generation includes allocating the core used for the rendering to a generation of raster data for the new characters.

8. The data processing device according to claim 5, wherein:
   the print data is described using a page description language;
   the rendering includes determining whether an order of a rendering process of the plurality of characters is changeable by analyzing the print data; and
   when the order is determined to be changeable, the rendering includes skipping the rendering of the character whose raster data is in process of generation and executing the rendering of the skipped character in response to completion of generation of the raster data.

9. An article of manufacture comprising non-transitory data storage storing computer-readable instructions that, when executed by a processor having N (N is an integer equal to or more than 2) cores of a data processing device, causes the data processing device to perform tasks comprising:
   searching a new character as a character whose raster data is not stored in the memory among a plurality of characters specified by character data included in print data to count a count of the searched new characters;
   generating M (M being an integer equal to or less than the N) threads, the M being a count determined based on the count of the counted new characters among the N;
   dividing and allocating the plurality of characters to the M threads to generate raster data for the new characters using any one of the N cores for each of the M threads; and
   rendering the plurality of characters using raster data corresponding to the character data,
   wherein two or more cores are used for font cache generation, and one or more cores is used for processing other than font cache generation, and
   wherein the allocation of processor cores to font cache generation is automatically changed in correspondence with a processing load for performing processing not associated with font cache generation.

10. The article of manufacture according to claim 9, wherein the rendering includes rendering the plurality of characters using a core that is different from the core used for processing of M threads, among the N cores.

11. The article of manufacture according to claim 10, wherein:
- the print data is described using a page description language;
- the rendering includes determining whether an order of a rendering process of the plurality of characters is changeable by analyzing the print data; and
- when the order is determined to be unchangeable, the raster-data generation includes allocating the core used for the rendering to a generation of raster data for the new characters.

12. The article of manufacture according to claim 9, wherein:
- the print data is described using a page description language;
- the rendering includes determining whether an order of a rendering process of the plurality of characters is changeable by analyzing the print data; and
- when the order is determined to be changeable, the rendering includes skipping the rendering of the character whose raster data is in process of generation and executing the rendering of the skipped character in response to completion of generation of the raster data.

* * * * *